United States Patent

[11] 3,588,604

| | | |
|---|---|---|
| [72] | Inventor | Arthur Hauspurg<br>717 Stuart Ave., Mamaroneck, N.Y. 10321 |
| [21] | Appl. No. | 767,270 |
| [22] | Filed | Oct. 14, 1968 |
| [45] | Patented | June 28, 1971 |

[54] APPARATUS FOR REDUCING SWITCHING TRANSIENTS ON SHUNT COMPENSATED HIGH VOLTAGE TRANSMISSION LINES
4 Claims, 1 Drawing Fig.

[52] U.S. Cl. .................................................. 317/11,
317/20, 317/61.5
[51] Int. Cl. .................................................. H02h 7/22
[50] Field of Search .......................................... 317/9 (PF),
16, 20, 11.1, 49, 50, 61.5

[56] References Cited
UNITED STATES PATENTS

| | | | |
|---|---|---|---|
| 1,287,244 | 12/1918 | Creighton | 317/20X |
| 1,295,885 | 3/1919 | Fortescue | 317/50 |
| 2,159,649 | 5/1939 | Alford | 317/49X |

Primary Examiner—James D. Trammell
Attorney—Pennie, Edmonds, Morton, Taylor and Adams ABSTRACT: A circuit breaker has contacts in series with a shunt compensating reactor, preferably on the ground side thereof, and a damping resistor is connected thereacross. The circuit breaker is interconnected with the line circuit breaker so as to introduce the resistor in series with the reactor when the line circuit breaker opens and thereby damp transient oscillations. When the line circuit breaker is reclosed, the other circuit breaker short-circuits the damping resistor.

PATENTED JUN28 1971
3,588,604
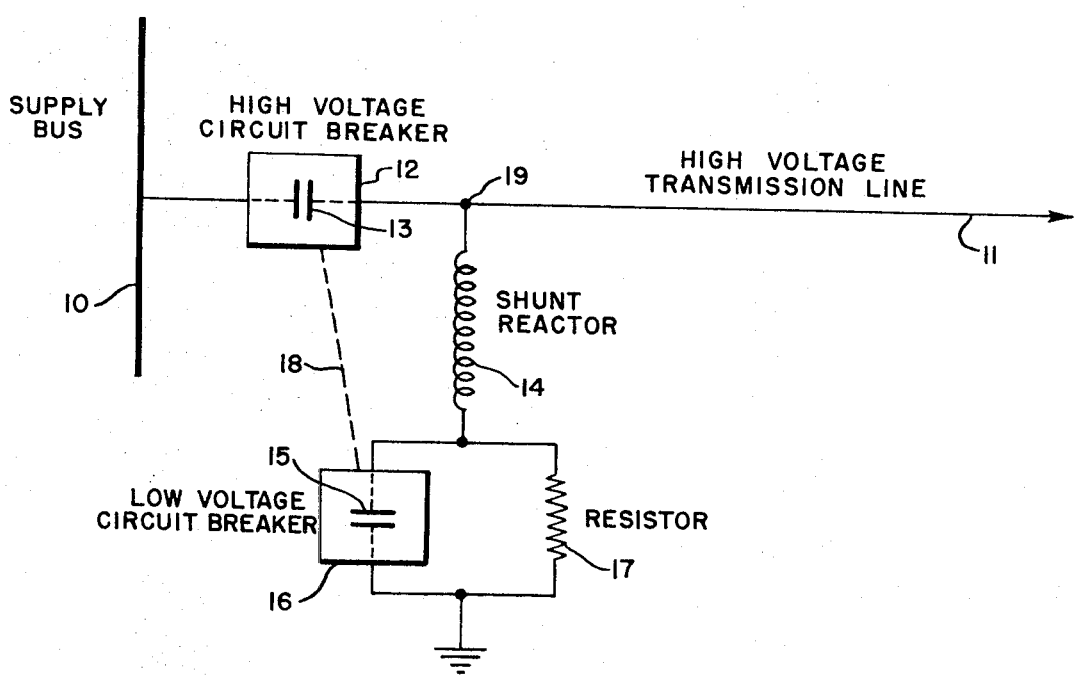
INVENTOR
Arthur Hauspurg
BY
Pennie Edmonds, Morton Taylor & Adams
ATTORNEYS

APPARATUS FOR REDUCING SWITCHING TRANSIENTS ON SHUNT COMPENSATED HIGH VOLTAGE TRANSMISSION LINES

BACKGROUND OF THE INVENTION

High voltage transmission lines for transmitting AC electric power are commonly protected by line circuit breakers so as to disconnect the lines from the power source or bus in case of abnormal conditions such as a short circuit, excessive load, lightning strike, etc. When the abnormal condition has passed, or been corrected, the circuit breakers are reclosed. Reclosing is frequently automatic after a predetermined delay interval selected on the basis of experience to allow sufficient time for the abnormality to clear.

Frequently such transmission lines are compensated by shunt inductive reactors. For example, high voltage lines operating at several hundred kilovolts, e.g. 345—765 kilovolts, commonly have a large capacitance and a shunt reactor is employed to reduce the effects of the line charging current. In such case, when the line circuit breaker is opened, the shunt inductive reactor and the capacitive transmission line form an oscillating circuit and transient oscillations at the natural frequency of the combination can result, with consequent high transient voltages on the line.

If a line circuit breaker is reclosed while the transient oscillations persist, a large transient voltage can occur if the circuit is closed when there is a large difference between the voltage on the power bus and the residual voltage on the transmission line. This may be a determining factor on the amount of insulation required for the line. Since increasing the insulation may be very costly, it is highly desirable to reduce or eliminate the transient overvoltage.

It has heretofore been proposed to use closing resistors in the high voltage circuit breakers and arrange for the resistors to be connected between power bus and transmission line in one or more steps before the main contacts close. Such closing resistors complicate the design of the high voltage circuit breakers and may not provide sufficient protection since they are commonly in circuit for only a few milliseconds.

SUMMARY OF THE INVENTION

The present invention provides an improved apparatus for reducing switching transients on shunt-compensated high-voltage AC transmission lines.

In accordance with the invention, damping is introduced in the shunt circuit when the line circuit breaker is opened, so as to damp transient oscillations, and the damping is removed when the line circuit breaker is reclosed. To this end, a damping resistor or, in general, damping resistance means, is effectively introduced into or removed from the shunt circuit by a second circuit breaker interconnected with the line circuit breaker. The second circuit breaker introduces the damping resistance means to damp the transient oscillations while the line circuit breaker is open, and removes the damping when the line circuit breaker is reclosed.

In accordance with a specific embodiment, the second circuit breaker has contacts in series with the inductive reactor, and advantageously on the ground side thereof, and a damping resistor is connected across the contacts. The interconnection between circuit breakers causes these contacts to open when the line circuit breaker opens, thereby introducing the resistor in series with the reactor and damping any transient oscillations existing on the transmission line. When the line circuit breaker is reclosed, the contacts of the second circuit breaker close so as to short circuit the resistor and effectively remove it from the shunt circuit.

Simultaneous opening and closing of the contacts of the second circuit breaker with the line circuit breaker is particularly contemplated. With this arrangement damping is effective throughout the period the transmission line is disconnected from the power bus, so that adequate time is available for damping. Upon reclosing, the damping is removed so that it has no appreciable effect during normal operation.

The second circuit breaker is advantageously on the ground side of the shunt reactor, so that only a low voltage breaker is required, and resistor insulation problems are avoided.

BRIEF DESCRIPTION OF THE DRAWING

The single FIG. illustrates apparatus in accordance with the invention.

DESCRIPTION OF THE SPECIFIC EMBODIMENT

An AC power source or supply bus 10 is connected to a high voltage transmission line 11 through a conventional high-voltage circuit breaker 12 whose contacts are illustrated diagrammatically at 13. Shunt inductive reactor 14, of conventional design, is connected between line 11 and ground by either the contacts 15 of a low-voltage circuit breaker 16 when they are closed, or through resistor 17 when the contacts 15 are open. Circuit breakers 12 and 16 are interconnected as indicated by the dotted line 18 so that the contacts 13 and 15 are either both open, as indicated, or both closed. The interconnection may be selected to meet the requirements of a particular application, and will commonly be electrical.

In normal operation both sets of contacts will be closed, and contacts 15 will short circuit resistor 17. When abnormal conditions cause circuit breaker 12 to open its contacts 13, transient oscillations may arise in the circuit including the transmission line 11 and the reactor 14, developing high transient voltages at point 19. Since contacts 15 will then be open, resistor 17 is in series in the oscillating circuit and transient oscillations will be damped. Commonly the interval between opening and reclosing of the line circuit breaker 12 will be greater than about 0.3 seconds. Resistor 17 can be selected to provide adequate damping under conditions encountered in the particular application. When the line circuit breaker 12 is reclosed, the voltage at point 19 will be at ground potential, or sufficiently low so that a large transient voltage will not exist at the time of reclosing. Thus the reclosing of the circuit breaker 12 is subject only to normal closing considerations, substantially free of adverse effects due to transients on line 11.

The line circuit breaker 12 conventionally used is quite complicated. However the circuit breaker 16 may be quite simple, and may for e example be a low voltage DC relay having its actuating coil energized by auxiliary contacts of circuit breaker 12 arranged to close when the main contacts 13 open.

In the drawing only a single-phase transmission line 11 is shown. With three-phase transmission, each line may be protected in the manner shown. In some operating practices the opening of a line circuit breaker in one phase leaves the other phases in operation, whereas in others the remaining phases are also disconnected from the power source. The invention is applicable to both situations, with suitable interconnection if required.

I claim:

1. Apparatus for reducing switching transients on a high voltage transmission line wherein a line circuit breaker is arranged in series between a source of power and the transmission line and a shunt circuit including an inductial reactor is connected to said transmission line on the line side of said circuit breaker, said apparatus comprising damping resistance means, and a second circuit breaker interconnected with said line circuit breaker for effectively connecting said damping resistance means in said shunt circuit to damp transient oscillations therein when said line circuit breaker is opened and effectively removing said damping resistance means from said shunt circuit when said line circuit breaker is reclosed.

2. Apparatus according to claim 1 in which said second circuit breaker connects said damping resistance means in series with said reactor when the line circuit breaker is opened.

3. Apparatus according to claim 1 in which said second circuit breaker has contacts in series with said reactor and said damping resistance means is connected across said contacts, said contacts being opened when said line circuit breaker is opened and closed when said line circuit breaker is closed.

4. Apparatus according to claim 3 in which said shunt circuit including a reactor is connnected between said transmission line and ground, said contacts of the second circuit breaker being connected between said reactor and said ground.

PO-1050
(5/69)

UNITED STATES PATENT OFFICE
CERTIFICATE OF CORRECTION

Patent No. 3,588,604                    Dated   June 28, 1971

Inventor(s)       ARTHUR HAUSPURG

It is certified that error appears in the above-identified patent and that said Letters Patent are hereby corrected as shown below:

Col. 2, line 44, "for e example" should read -- for example -- .

" ", line 57, (claim 1, line 2), "voltage transmission" should read -- voltage A-C transmission -- .

" ", line 58, (claim 1, line 3), "source of power" should read -- source of A-C power -- .

" ", line 59, (claim 1, line 4), "inductial" should read -- inductive -- .

Signed and sealed this 7th day of December 1971.

(SEAL)
Attest:

EDWARD M. FLETCHER, JR.          ROBERT GOTTSCHALK
Attesting Officer                Acting Commissioner of Patents